United States Patent
Orkisz

(10) Patent No.: US 7,069,154 B2
(45) Date of Patent: Jun. 27, 2006

(54) METHOD AND APPARATUS FOR DETECTING AND AUTOMATICALLY IDENTIFYING DEFECTS IN TECHNICAL EQUIPMENT

(75) Inventor: Michal Orkisz, Krakow (PL)

(73) Assignee: ABB SP.ZO.O., Warszawa (PL)

( * ) Notice: Subject to any disclaimer, the term of this patent is extended or adjusted under 35 U.S.C. 154(b) by 0 days.

(21) Appl. No.: 10/524,449

(22) PCT Filed: Oct. 3, 2002

(86) PCT No.: PCT/PL02/00072

§ 371 (c)(1),
(2), (4) Date: Feb. 11, 2005

(87) PCT Pub. No.: WO2004/018981

PCT Pub. Date: Mar. 4, 2004

(65) Prior Publication Data

US 2005/0261876 A1 Nov. 24, 2005

(30) Foreign Application Priority Data

Aug. 26, 2002 (PL) .................................. P 355697

(51) Int. Cl.
*G01B 5/28* (2006.01)
*G01F 5/30* (2006.01)
*G06F 19/00* (2006.01)

(52) U.S. Cl. ........................ 702/35; 700/175; 700/176; 73/598; 73/599; 73/600; 702/182

(58) Field of Classification Search ..................... None
See application file for complete search history.

(56) References Cited

U.S. PATENT DOCUMENTS

| 5,483,833 A | * | 1/1996 | Dickens et al. ................ 73/583 |
| 5,686,669 A | * | 11/1997 | Hernandez et al. ............ 73/660 |
| 5,875,420 A | * | 2/1999 | Piety et al. .................. 702/182 |

* cited by examiner

*Primary Examiner*—John Barlow
*Assistant Examiner*—Sujoy Kundu
(74) *Attorney, Agent, or Firm*—Michael M. Rickin

(57) ABSTRACT

A method and apparatus for detecting and automatically identifying defects in technical equipment, is disclosed. Measurement signals varying in time are downloaded as spectrograms to a computer memory. Using a predetermined criteria a set of designated peak values is created. Using another predetermined criteria the set of designated peak values is divided into two subsets. Then in one of the subsets, peak groups differing from each other by the basic frequency values are distinguished. The second subset, created from the set of designated peak values, is searched for the presence of sidebands for peaks from each specified peak group and if the sidebands are present the basic frequency of the sidebands is calculated. Then the existence of a defect in the technical equipment is detected, and identified by comparing the basic frequencies and the basic frequencies of the sidebands with the frequency values collected in the computer memory.

9 Claims, 3 Drawing Sheets

Figure 1:
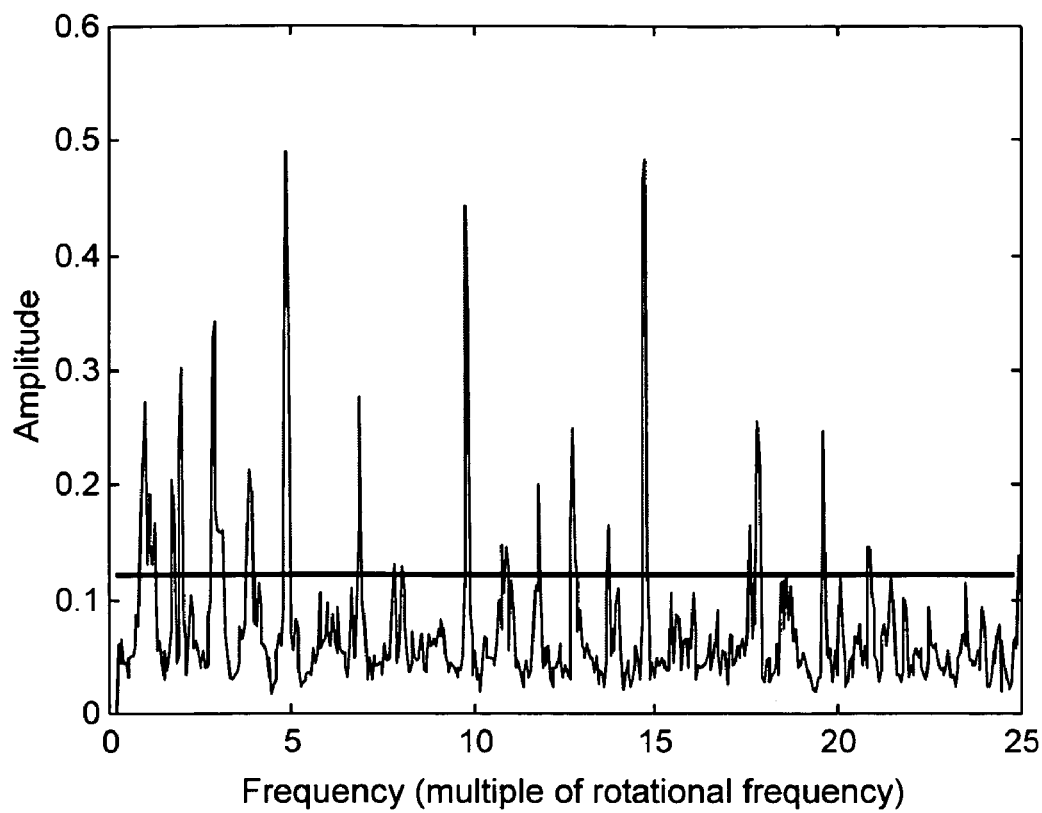

METHOD AND APPARATUS FOR DETECTING AND AUTOMATICALLY IDENTIFYING DEFECTS IN TECHNICAL EQUIPMENT

The subject of the invention is a method for detecting and automatically identifying defects in technical equipment, applicable to fault diagnosing in technical equipment, especially rotating machinery.

When assessing the technical condition of technical equipment, and especially when detecting and identifying defects in rotating electric machines and their parts, methods based on the measurement of electric or mechanical signals and the spectrum analysis of these measured signals are relatively often used. Measurement signals variable in time are presented in the form of their frequency spectra, and their graphs are subjected to detailed analysis. Therefore, a spectrogram describes frequency distribution in a given signal. A peak in the spectrogram denotes the presence of a corresponding frequency in the given signal.

The standard method of defects detection and analysis consists in checking the spectrogram for peaks corresponding to the multiples of the frequency generated by the given defect. Available tools facilitate this task by visualising this process, but they do not change its principle. A disadvantage of such method of conducting the assessment of the technical condition is the necessity to exactly know the specific frequency associated with the given defect. For example, for an assessed bearing, this is the resultant of the shaft rotational frequency and the bearing geometry. If one of these data is missing, the analysis cannot be done or it is very uncertain.

From Polish patent description No. 171 505 there is known a method for assessing the technical condition of a gear transmission based on the analysis of the vibroacoustic signal, which consists in the examination of the amplitude of spectral lines of frequencies corresponding to the product of the rotational frequency and the number of the teeth of a gear wheel, in the narrow-band spectra of the gear transmission operating at different speeds, and the frequency of the spectral line of the highest amplitude is assumed to be the local resonant frequency reflecting the stiffness of the co-operating teeth. Then, by comparing this local resonant frequency with the standard value specific for the given transmission, manufacturing faults or wear are determined.

From a Polish patent description No. 148 831 there is known a method for detecting shortings and deficiencies in the stator windings of an induction motor, in which, during the motor operation, the band frequency characteristics of the motor are measured by measuring the band frequency characteristics of the tangent of the velocity or acceleration of the motor vibrations with a view to determining the occurrence in the frequency characteristics of modal values of specific frequencies characteristic of shortings and deficiencies in stator windings or their harmonics. The obtained voltage-type signal is compared with the set value, and the occurrence of a defect is signalled by exceeding this set value.

From U.S. Pat. No. 5,895,857 there is known a method of detecting defects in machinery having rotating or reciprocating elements, especially in transmissions and bearings. The method consists in selecting the amplitude peaks for specific sampling time intervals from the measured signal representing the spectra of amplitude and frequency of vibrations of the examined rotating element. These peak values are compared with the velocity signal measured by the velocity sensor that is installed on the rotating element, and the comparison of these values takes place after a previous synchronisation and averaging of the peak amplitude values and velocity signals, and these synchronously averaged amplitude values are converted to the natural frequency, in order to determine the presence of defects in the examined rotating element. The description presents also a method of converting a vibration signal generated by a vibration sensor attached to the examined rotating element to a signal representing the natural frequency generating the peak values in the spectrum.

In the presented methods of assessment of the technical condition of technical equipment measured values of various signals, shown in spectrograms, are compared with known, predetermined threshold values.

The method for detecting and automatically identifying defects in technical equipment according to the invention, in which measuring signals variable in time are measured by means of a known measuring device, and the measurement results in the form of spectrograms are fed to the memory of a computer, to which appropriate data bases are supplied, consists, at the first stage, in selecting peaks of amplitude values bigger than a specific, predetermined amplitude threshold value, out of at least one spectrogram, of which peaks a set of designated peak values is created. Then, the relation between the frequency of each peak and the frequency of the other peaks is calculated for all peaks from this set, after which, depending on the value of the obtained quotient, the set of designated peak values is divided into two subsets. Further on, in the second stage, in one of the subsets subsequent specific peak groups are distinguished, which differ from one another by the values of the basic frequency, which is one of the factors of the quotient, recurring regularly in one of those groups. For peaks from every specific peak group the presence of sidebands is sought for in the second subset created from the set of designated peak values and if the presence of sidebands is found the basic frequency of the sidebands is calculated. Next, in the third stage, the existence of a defect in the piece of technical equipment is detected and then identified by comparing the basic frequencies and the basic frequencies of the sidebands with the values of the frequencies that are stored in the computer device memory, in the data signatures base and in technical data base of the piece of the technical equipment. The results of such an analysis of the spectrogram or spectrograms are presented by means of a device for visualising the results, coupled with the computer device.

Preferably, in the first stage the set of designated peak values is divided into two subsets of peaks, where one subset comprises peak values for which the ratio of their frequency values to the frequency values of all the other peaks is expressed by the quotient of integers smaller than 10, and the second peak subset comprises all the remaining peaks.

Preferably, in the second stage, the second subset created from the set of designated peak values is searched for the presence of sidebands for any peak pairs by calculating the ratios of the difference between the frequency value of one peak of the given peak pair and the frequency value of the nearest peak from a specific peak group to the difference between the frequency value of the second peak of the given pair and the frequency value of the nearest peak from a specific peak group, after which, depending on the value of the obtained quotient, a new subset is created in the second subset, from which there are then separated subsequent peak groups differing from each other by the values of the basic frequency of the sidebands, which basic frequency is one of the factors of the quotient, consistently recurring in one of these groups.

Preferably, the new peak subset formed from peak pairs in the second subset comprises such peak pairs, for which the calculated ratios of the difference between the frequency value of one peak from the given peak pair and the frequency value of the nearest peak from a specific peak group to the difference between the frequency value of the second peak from the given pair and the frequency value of the nearest peak from the specific peak group are expressed as quotients of integers of absolute values less than 10.

The advantage of the inventive method is the possibility to detect and identify the presence of a defect in cases where the exact frequencies of the defects in specific technical equipment are not known.

The inventive method involves examining the relations between all peaks and their sidebands and searching out frequencies that are integral multiples of a certain, originally unspecified frequency. The designation of the basic frequency and the basic frequencies of the sidebands provides sufficient information to make a quantitative comparison with frequencies connected with the given defect and/or qualitative comparison with the characteristic signature of the given defect.

Figure 5:
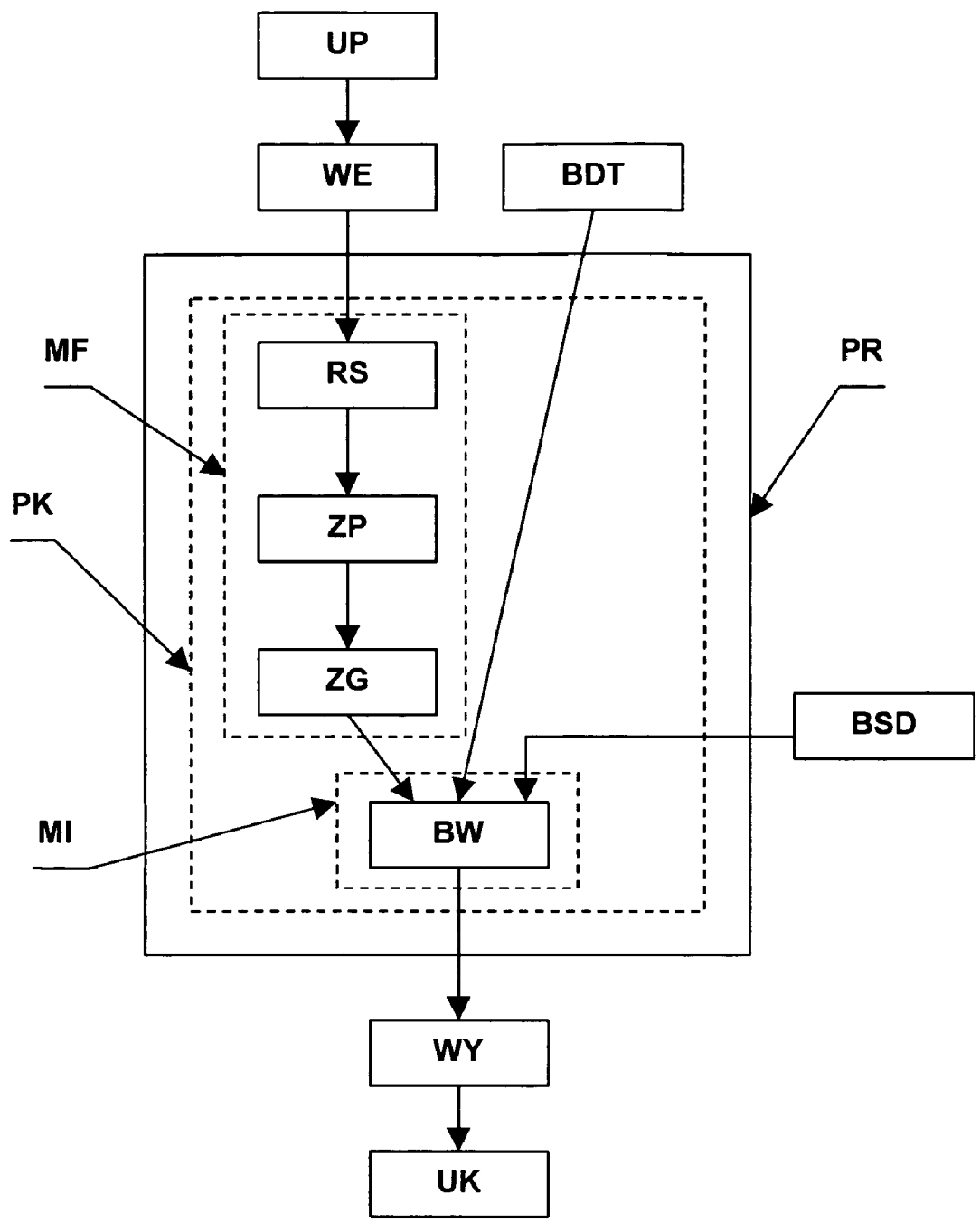

The subject of the invention is explained by its embodiment and a drawing where FIG. 1, 2, 3, 4, show examples of spectrograms of the examined piece of equipment, wherein the consecutive steps of the realisation of the invention are indicated, and FIG. 5 shows an example of equipment used to realise the method according to the invention.

The method according to the invention can be realised as follows.

1. In the spectrogram /FIG. 1/ supplied to the computer device, showing the value of the amplitude in the function of the frequency of the given signal of the examined technical equipment, there is indicated the threshold value of the amplitude, which is the value of the median for this diagram multiplied by 2.5. The threshold value is shown in the spectrogram in the form of a full line.

Figure 2:
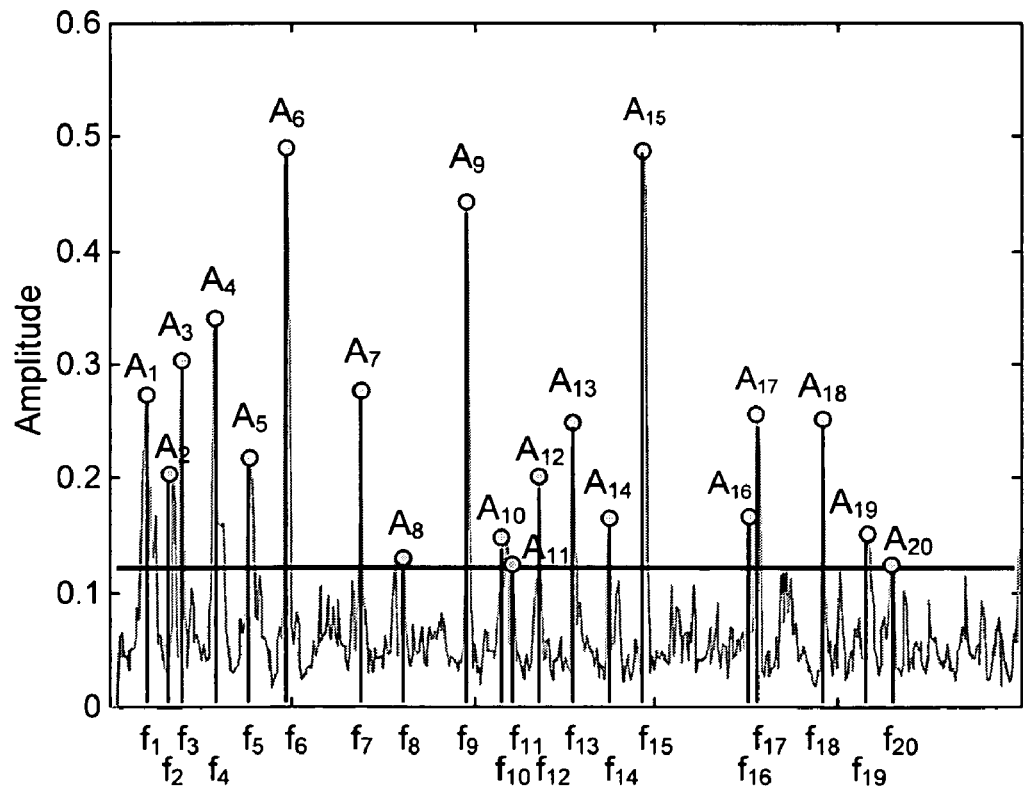

2. All the consecutive peaks of the spectrogram are compared with the threshold value of the amplitude and from peaks, for which their amplitudes are bigger than the threshold value, a set of designated peaks $A_1 \ldots A_n$, is created, where each of the peaks of this set is characterised by a different frequency value $f_1 \ldots f_n$/FIG. 2/.

3. From the set of designated peaks $A_1 \ldots A_n$, peaks are successively selected and for these peaks the ratio of the frequency values of these peaks divided by the frequency values of all the other peaks is calculated.

Figure 3:
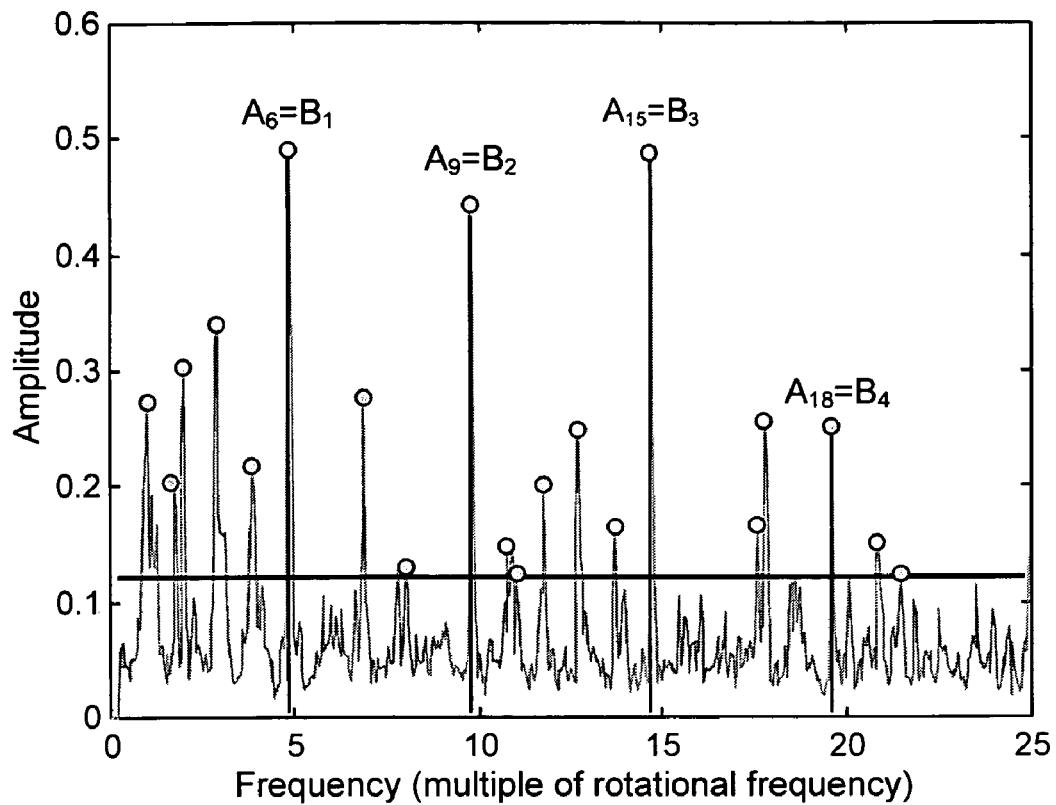

4. From peak pairs, for which calculated ratios are expressed as quotients of small integers /less than 10/ a subset $\{A\}$ of the set $A_1 \ldots A_n$ is created, and from the other peaks a peak subset $\{Z\}$ is created, for example, in FIG. 3 these are peaks $A_6, A_9, A_{15}, A_{18}$ from the subset $\{A\}$, for which the ratios of peak frequencies $f_{15}/f_6 = 3/1$, $f_{18}/f_9 = 2/1$, $f_{15}/f_9 = 3/2$ and $f_7/f_4$ from the subset $\{Z\}$ of ratio=217/100.

5. Then, from the subset $\{A\}$ successive groups of peaks $B_1 \ldots B_n$, $C_1 \ldots C_n$, $D_1 \ldots D_n$ etc. are separated, which differ from each other by frequency values constituting one of the factors of the product that recurs in the given group $B_1 \ldots B_n$ or $C_1 \ldots C_n$ or $D_1 \ldots D_n$, the other factor of the product is any integer. The recurring product factor constitutes basic frequency $\omega_b$, $\omega_c$ or $\omega_d$ of the given peak group. Peaks $A_6, A_9, A_{15}, A_{18}$ form a set $B_1 \ldots B_4$ of basic frequency $\omega_b = 4.95$, /FIG. 3/.

Figure 4:
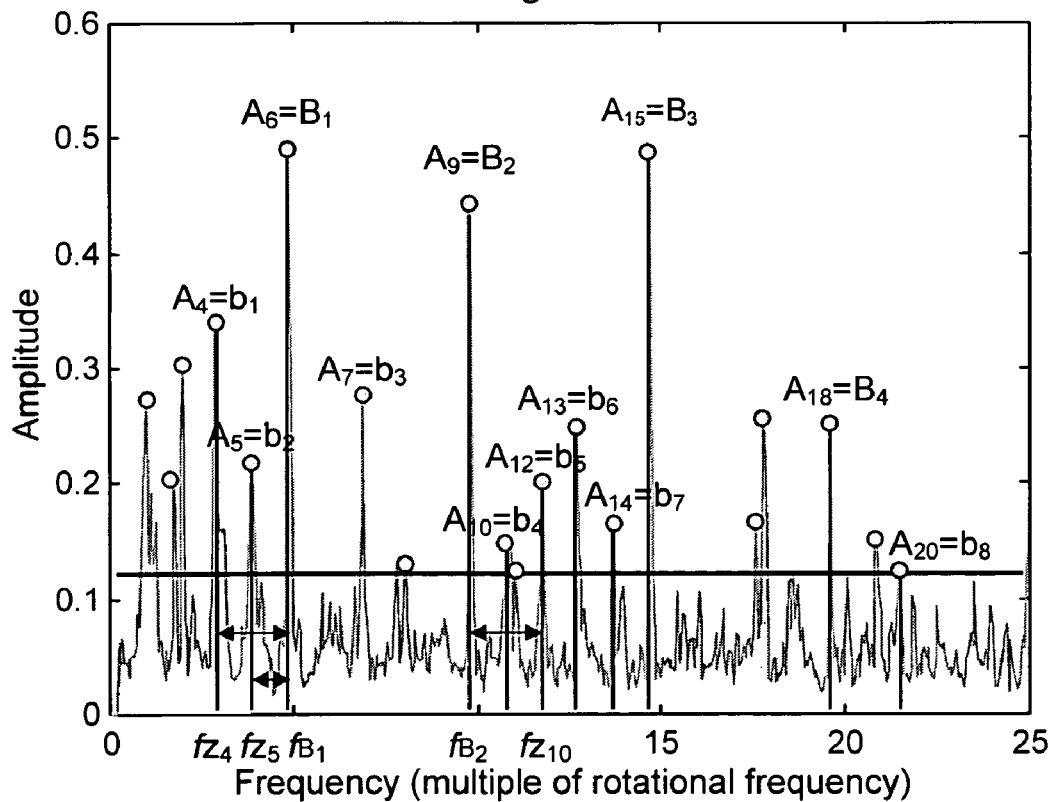

6. Next, for all peaks from the group $B_1, \ldots B_n$ the presence of sidebands is sought for. For this purpose further analysis of the spectrograms is carried out, which consists in the following:

a/ from the peak subset $\{Z\}$ all peak pairs of frequencies $\{fz_j, fz_k\}$ are selected and for each peak pair there is calculated the ratio of the difference between the peak frequency value $fz_j$ and such frequency value of a peak from the group $B_1 \ldots B_n$, which is the nearest to the peak of the value $fz_j$, divided by the difference between peak frequency value $fz_k$ and such frequency value of a peak from the group $B_1 \ldots B_n$, which is the nearest to the peak of the value $fz_k$.

b/ from peak pairs, for which the calculated ratios are expressed as quotients of small integers /of absolute value less than 10/ a subset $\{ZZ\}$ of the set $\{Z\}$ is created, for example, in FIG. 4, the ratio of the distance $A_4-B_1$ to the distance $A_5-B_1$ is 2:1, and the ratio of the distance $A_{10}-B_2$ to the distance $A_5-B_1$ is $-1:1$, c/ if in subsection b/ the subset $\{ZZ\}$ is an empty set for peaks from the group $B_1 \ldots B_n$, and from the groups $C_1 \ldots C_n$, $D_1 \ldots D_n$ etc., then the absence of sidebands is found and the actions presented in section 7 are performed, if not, actions mentioned in subsection d/ are performed, d/ Then, from the subset $\{ZZ\}$ successive peak groups $b_1 \ldots b_n, c_1 \ldots c_n, d_1 \ldots d_n$ etc. are separated, which differ from each other by the values of rotational frequencies, constituting one of the factors of the product, which recurs in the given subset $b_1 \ldots b_n$ or $c_1 \ldots c_n$ or $d_1 \ldots d_n$, the other factor of the product is any integer. The recurring product factor is the basic frequency of sidebands $\omega_{b1}$, $\omega_{c1}$ or $\omega_{d1}$ of the given peak group, for example, peaks $b_1, b_2, b_3$ are sidebands of peak $B_1$, peaks $b_4, b_5$—of peak $B_2$, peaks $b_6, b_7$—of peak $B_3$, and peak $b_8$—of peak $B_4$ /FIG. 4/.

e/ the actions presented in subsections a-d are repeated for peak groups $C_1 \ldots C_n$, $D_1 \ldots D_n$, etc. described in item 5.

7. The separated basic frequencies $\omega_b$, $\omega_c$ or $\omega_d$ and the basic frequencies of sidebands $\omega_{b1}$, $\omega_{c1}$ or $\omega_{d1}$ of a given peak group are compared with the frequency values, which are collected in the data signature base BSD, as frequencies known for various types of defects, and depending on the type of the technical equipment whose technical data are collected in the technical data base BDT—the type of defect of the given technical equipment is detected and identified. Next, the result of such analysis of a spectrogram or spectrograms are presented by means of a results visualisation device coupled with a computer device.

For example, the existence of a bearing defect can be inferred from the existence of distinct peaks in the spectrum. From the fact that the basic frequency $\omega_b$ is approximately equal to 5X the rotational frequency of the piece of equipment and from the fact of existence of sidebands it can be inferred that the defect is connected with the inner race of the bearing. In the case of a defect of the outer raceway, the basic frequency would usually be lower and there would be no sidebands. Other defects can be eliminated in a similar way and the type of the defect can be determined with considerable likelihood, and a precise knowledge of frequencies connected with a bearing defect is not required while conducting the analysis.

The inventive method is realised in a device for detecting and automatically identifying defects in technical equipment.

This device is a processor PR, incorporating memory PK, in which a functional module MF and an identification module MI can be distinguished. The functional module MF comprises a spectrograms register RS, a peak selection and register unit ZP and a group classification unit ZG. The functional module MF via the spectrograms register RS is connected through an input WE of the processor PR, to which input a measuring device UP is connected if any on-line measurements are made. Any information carrier containing measurement data can be connected to the spectrograms register RS through the input WE. The output of the functional module MF is connected with the identification module MI, to which the base of technical data characterising the given examined piece of equipment BDT and the defects signature database BDS are connected. The output of the identification module MI is at the same time the output WY of the processor PR and it is connected with the final report visualisation device UK, which can be a display on the computer screen or a printer.

The invention claimed is:

1. A method for detecting and automatically identifying defects in technical equipment, wherein measurement signals varying with time are measured by means of a known measuring device, and the results of the measurements in the form of spectrograms are downloaded to the memory of a computer, to which appropriate data bases are also downloaded, characterised in that in the first stage peaks of amplitude values bigger than a specified set amplitude threshold value are selected from at least one spectrogram, of which peaks a set of designated peak values is created, then the ratio of the frequency of each peak to the frequency of the other peaks is calculated for all peaks of this set, whereupon, depending on the value of the obtained quotient, the set of designated peak values is divided into two subsets, and then in the second stage in one of the subsets successive specific peak groups are distinguished, which differ from each other by the values of the basic frequency, constituting one of the product factors, consistently recurring in one of these groups, whereupon for peaks from every specific peak group the presence of sidebands is sought for in the second subset created from the set of designated peak values and if the presence of sidebands is found, the basic frequency of the sidebands is calculated, after which, in stage three, the presence of a defect in the technical equipment is detected, which is then identified by comparing the basic frequencies and the basic frequencies of the sidebands with the frequency values collected in the computer device memory, in the data signature base and in the base containing technical data of the technical equipment, and then the result of such analysis of the spectrogram or spectrograms is presented by means of a results visualisation device coupled with the computer device.

2. A method according to claim 1, characterised in that in the first stage the set of designated peak values is divided into two subsets of peaks, one subset comprising such peak values for which the ratio of their frequency values to the frequency values of all the other peaks is expressed by a quotient of integers smaller than 10, and the other peak subset consists of all the other peaks.

3. A method according to claim 1, characterised in that in the second stage, the second subset created front the set of designated peak values is searched for the presence of sidebands for any peak pairs, by calculating the ratios of the difference between the frequency value of one peak of the given peak pair and the frequency value of the nearest peak from a specific peak group to the difference between the frequency value of the second peak of the given pair and the frequency value of the nearest peak from a specific peak group, after which, depending on the value of the obtained quotient, a new subset is created in the second subset, from which there are then separated subsequent peak groups differing from each other by the values of the basic frequency of the sidebands, which basic frequency is one of the factors of the quotient, consistently recurring in one of these groups.

4. A method according to claim 3, characterised in that the new peak subset created from peak pairs in the second subset consists of such peak pairs, for which the calculated ratios of the difference between the frequency value of one peak from the given peak pair and the frequency value of the nearest peak from the specific peak group to the difference between the frequency value of the second peak from the given pair and the frequency value of the nearest peak from the specific peak group, are expressed in the form of quotients of integers of absolute value smaller than 10.

5. A device for detecting and automatically identifying defects in technical equipment, comprising:
a measurement device for measuring signals varying in time;
a processor having a memory, said processor connected to said measurement device and operable to store the measured signals in the form of spectrograms and to perform a method comprising:
selecting first stage peaks of amplitude values bigger than a specified set amplitude threshold value from at least one spectrogram, of which peaks a set of designated peak values is created, then the ratio of the frequency of each peak to the frequency of the other peaks is calculated for all peaks of this set, whereupon, depending on the value of the obtained quotient, the set of designated peak values is divided into two subsets, and then in the second stage in one of the subsets successive specific peak groups are distinguished, which differ from each other by the values of the basic frequency, constituting one of the product factors, consistently recurring in one of these groups, hereupon for peaks from every specific peak group the presence of sidebands is sought for in the second subset created from the set of designated peak values and if the presence of sidebands is found, the basic frequency of the sidebands is calculated, after which, in stage three, the presence of a defect in the technical equipment is detected, which is then identified by comparing the basic frequencies and the basic frequencies of the sidebands with the frequency values collected in the processor memory, in the data signature base and in the base containing technical data of the technical equipment.

6. The device of claim 5 wherein said method performed in said processor further comprises presenting by a visualization device the presence of a defect detected in said technical equipment.

7. The device of claim 5 wherein said method performed in said processor further comprises dividing said first stage set of designated peak values into two subsets of peaks, one subset comprising such peak values for which the ratio of their frequency values to the frequency values of all the other peaks is expressed by a quotient of integers smaller than 10, and the other peak subset consists of all the other peaks.

8. The device of claim 5 wherein said method performed in said processor further comprises searching said second subset created from the set of designated peak values for the presence of sidebands for any peak pairs, by calculating the ratios of the difference between the frequency value of one peak of the given peak pair and the frequency value of the nearest peak from a specific peak group to the difference between the frequency value of the second peak of the given pair and the frequency value of the nearest peak from a specific peak group, after which, depending on the value of the obtained quotient, a new subset is created in the second subset, from which there are then separated subsequent peak groups differing from each other by the values of the basic frequency of the sidebands, which basic frequency is one of the factors of the quotient, consistently recurring in one of these groups.

9. The device of claim 8 wherein said new peak subset created from peak pairs in the second subset consists of such peak pairs and said method performed in said processor further comprises expressing for the calculated ratios of the difference between the frequency value of one peak from the given peak pair and the frequency value of the nearest peak from the specific peak group to the difference between the frequency value of the second peak from the given pair and the frequency value of the nearest peak from the specific peak group in the form of quotients of integers of absolute value smaller than 10.

* * * * *